US008418219B1

(12) United States Patent  (10) Patent No.: US 8,418,219 B1
Parsons et al.  (45) Date of Patent: Apr. 9, 2013

(54) METHOD AND APPARATUS FOR SIMULTANEOUSLY TESTING MULTIPLE SET-TOP BOXES

(75) Inventors: Gerald J. Parsons, Chester Springs, PA (US); Michael P. Parsons, Chester Springs, PA (US); Jobin N. Thomas, Downingtown, PA (US); John Goldman, Elverson, PA (US); John J. McGrath, Kenneth Square, PA (US); Gordon Gar-Tung Lo, West Chester, PA (US); Peik-Chein Khor, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 841 days.

(21) Appl. No.: 12/583,344

(22) Filed: Aug. 19, 2009

(51) Int. Cl.
 *H04N 7/16* (2011.01)
(52) U.S. Cl.
 USPC ........... 725/151; 348/180; 348/181; 361/725; 361/727
(58) Field of Classification Search .................... 439/347
 See application file for complete search history.

(56) References Cited

U.S. PATENT DOCUMENTS

| | | | | |
|---|---|---|---|---|
| 4,361,372 A * | 11/1982 | Majkrzak et al. | ............. | 439/247 |
| 4,459,436 A | 7/1984 | Rubin | ......................... | 179/175.2 |
| 4,580,862 A * | 4/1986 | Johnson | ......................... | 439/248 |
| 4,599,644 A | 7/1986 | Fischer | ......................... | 358/84 |
| 4,723,302 A | 2/1988 | Fulmer et al. | ......................... | 455/2 |
| 4,764,808 A | 8/1988 | Solar | ......................... | 358/84 |
| 5,030,128 A * | 7/1991 | Herron et al. | ......................... | 439/372 |
| 5,205,575 A * | 4/1993 | Wladar | ......................... | 280/625 |
| 5,327,243 A * | 7/1994 | Maietta et al. | ......................... | 348/565 |
| 5,477,415 A | 12/1995 | Mitcham et al. | ............. | 361/686 |
| 5,488,572 A | 1/1996 | Belmont | ......................... | 364/514 |
| 5,619,398 A | 4/1997 | Harrison et al. | ............. | 361/686 |
| 6,024,607 A | 2/2000 | Wahl | ......................... | 439/639 |
| 6,231,371 B1 | 5/2001 | Helot | ......................... | 439/374 |
| 6,400,400 B1 * | 6/2002 | Isnardi et al. | ............. | 348/180 |
| 6,484,316 B1 | 11/2002 | Lindberg | ......................... | 725/17 |
| 6,512,378 B2 | 1/2003 | Fernandez | ............. | 324/539 |

(Continued)

FOREIGN PATENT DOCUMENTS

GB 2433666 A * 6/2007

*Primary Examiner* — Pankaj Kumar
*Assistant Examiner* — Timothy Newlin
(74) *Attorney, Agent, or Firm* — Michael F. PeTock, Esq.; PeTock & PeTock, LLC

(57) ABSTRACT

A method and apparatus for simultaneously testing multiple set-top boxes uses a test equipment structure or frame for receiving a known good set-top box and a plurality of set-top boxes to be tested against a known good set-top box. A movable shelf structure is provided for electrically connecting at least each set-top box to be tested by a single sliding motion. Connectors on a backplane are made moveable to adjust for slight variations in the position of the connectors on the set-top boxes. An infrared control system generates an infrared signal to transmit to each set-top box and other related equipment in the testing operation such as televisions and receivers such that the function of each set-top box and related equipment is the same at each instant. Analyzing equipment is provided to analyze at least the audio output of each set-top box being tested at a selected channel and compared to the audio output of the known good set-top box. The equipment may also include equipment for analyzing and comparing the video outputs. The test results are displayed for each set-top box being tested.

32 Claims, 13 Drawing Sheets

U.S. PATENT DOCUMENTS

| | | | |
|---|---|---|---|
| 6,588,548 B1 * | 7/2003 | Dewitt | 186/2 |
| 6,657,437 B1 | 12/2003 | LeCroy et al. | 324/538 |
| 6,838,884 B1 | 1/2005 | Dagate | 324/538 |
| 7,664,317 B1 * | 2/2010 | Sowerby | 382/162 |
| 2001/0001529 A1 * | 5/2001 | Behl et al. | 312/223.1 |
| 2008/0046946 A1 | 2/2008 | Diroo et al. | 725/112 |
| 2008/0144293 A1 * | 6/2008 | Aksamit et al. | 361/727 |
| 2009/0089854 A1 * | 4/2009 | Le et al. | 725/139 |
| 2009/0224639 A1 * | 9/2009 | Sosin | 312/223.1 |

* cited by examiner

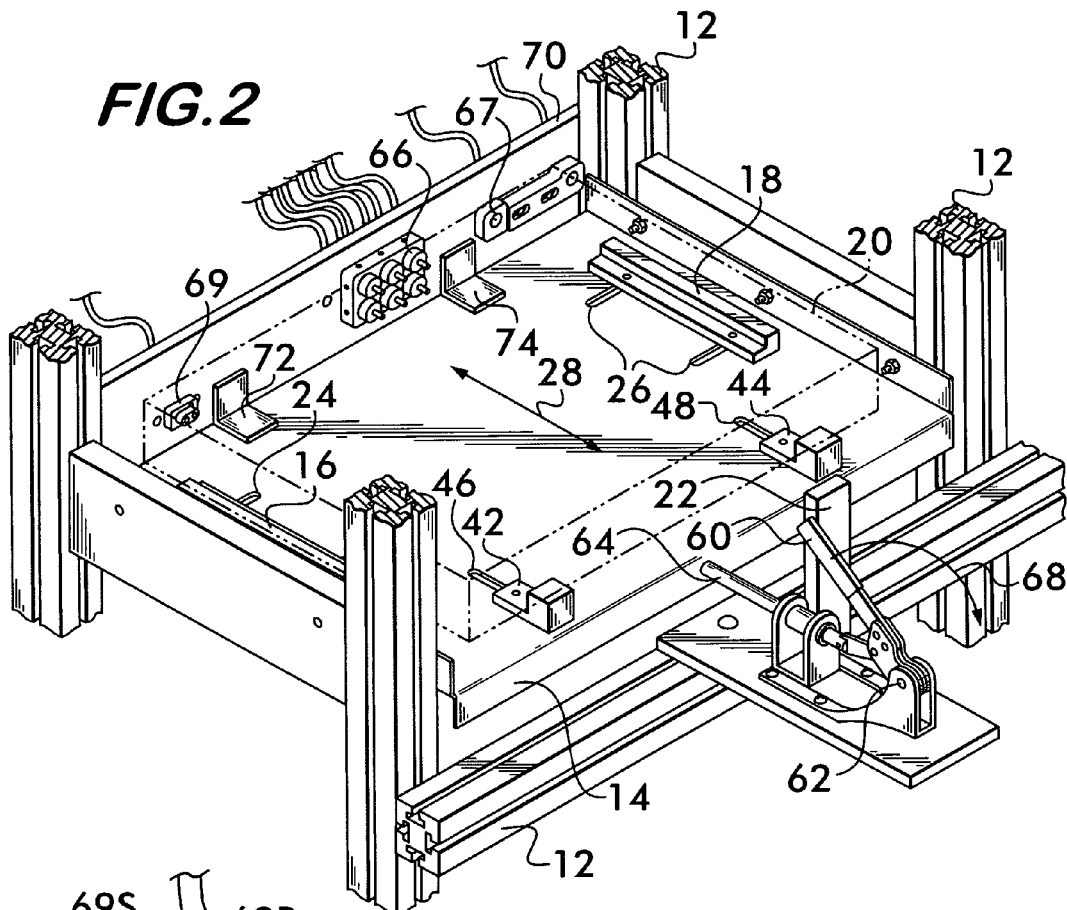
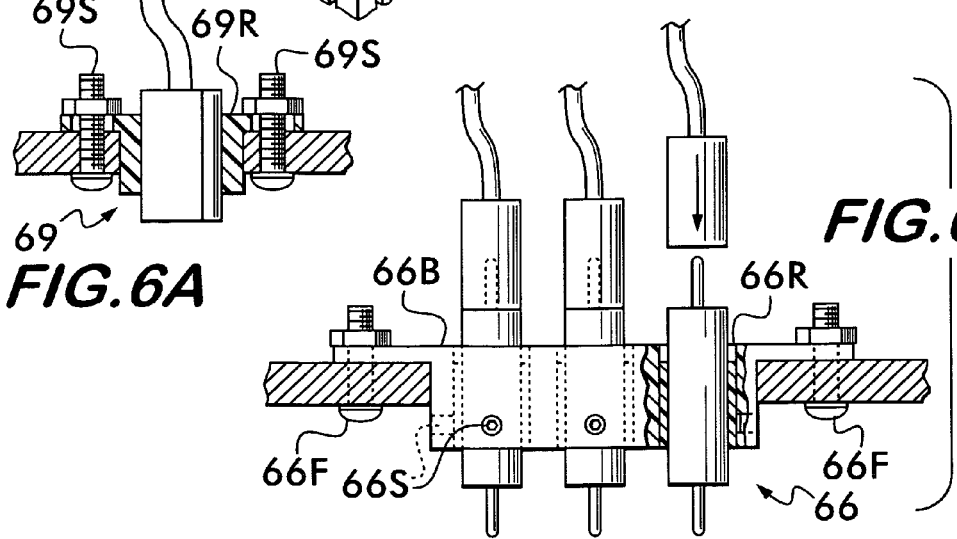

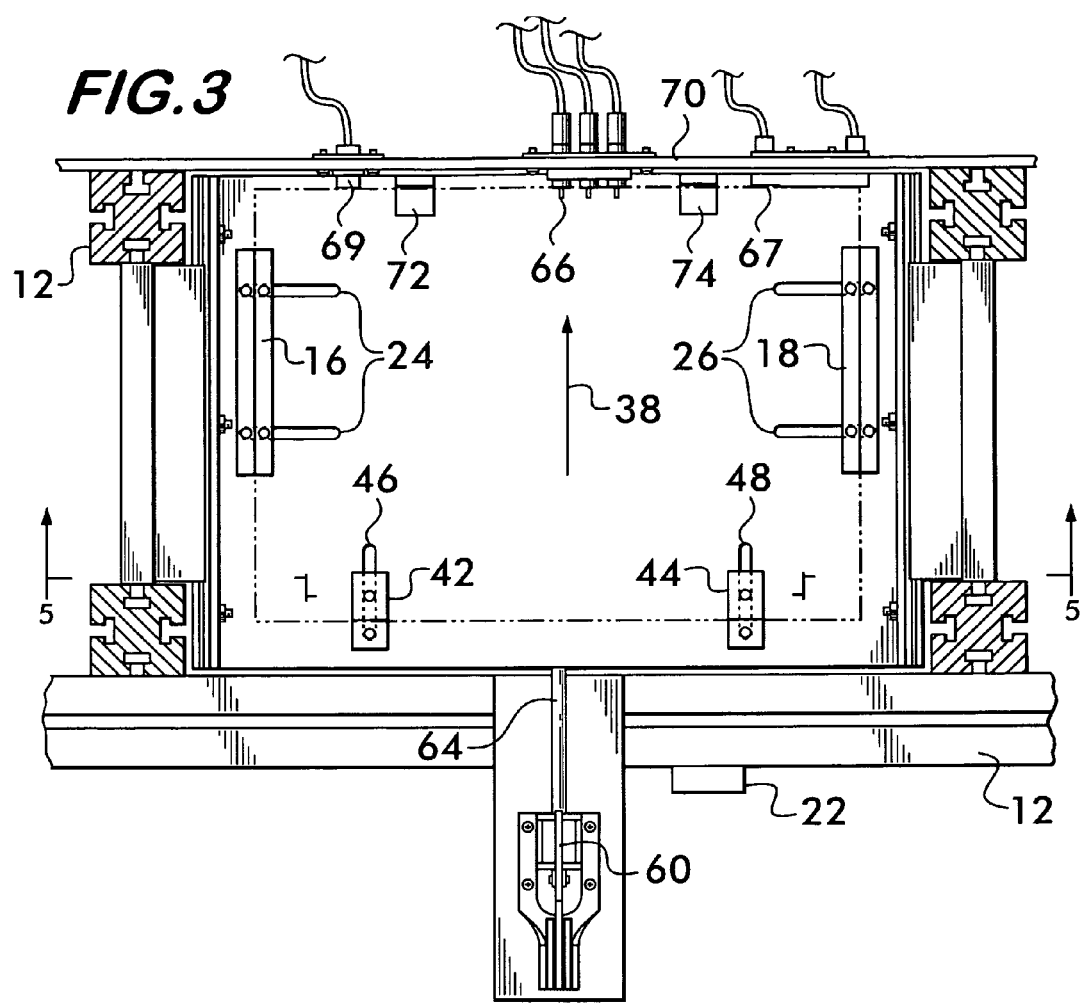
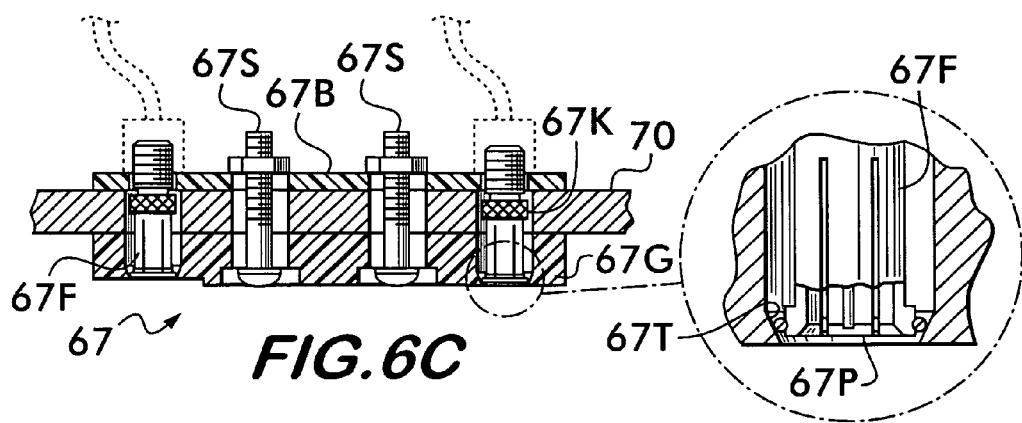

METHOD AND APPARATUS FOR SIMULTANEOUSLY TESTING MULTIPLE SET-TOP BOXES

FIELD OF THE INVENTION

The present invention relates to an apparatus and method for simultaneously testing multiple units of electronic equipment. More particularly, the present invention relates to an apparatus and method for quickly and efficiently testing simultaneously the operation of multiple set-top boxes under test and comparing their audio and video outputs to a known good set-top box.

BACKGROUND OF THE INVENTION

Television signal transmission to the public at large has become sophisticated, widespread and pervasive. Television transmission today is not limited to the transmission of a limited number of signals or channels to the population, such as by wireless antenna systems. Today, not only are there numerous channels of high quality entertainment, but interactive communication between the end user and the signal source, not only for selecting entertainment on demand but also for the purchase of various pay per view products and the like. The source of the signal may be a cable television system, a high speed telephone cable such as DSL, satellite or other suitable source. In order to enable these systems to work effectively, there must be a set-top box (sometimes referred to as a "STB") connected between the signal source and the television set, typically at the location of the television set.

These boxes are often rented or otherwise paid for by the consumer. Particularly where rented, the boxes may be retrieved by the source company when a subscriber's service is terminated for any of various reasons. These boxes, along with other boxes that may be retrieved from the field as allegedly defective need to be tested and determined as to their operability. With almost every household in the United States having one or more televisions and set-top boxes today, this generates a large volume of required testing of set-top boxes. This testing is a time consuming and expensive operation, but must be done to provide the customer with a set-top box of known operability, particularly in view of the fact that the set-top boxes are too expensive to be discarded.

SUMMARY OF THE INVENTION

An advantage of the present invention is that multiple units of electronic equipment may be simultaneously tested such as multiple set-top boxes.

Another advantage of the present invention is that a relatively large number of set-top boxes, such as eleven or some other suitable number, may be compared against a known good set-top box for each channel or other function tested.

Another advantage of the present invention is that the set-top boxes under test may be quickly and easily electrically connected and/or disconnected making or breaking multiple electrical connections by a simple sliding action which may be initiated by the movement of a lever.

Another advantage of the present invention is that the testing equipment may provide for the making of electrical connections without damaging the set-top box even though there are small variations in the exact position of the electrical connectors on the back of the set-top box.

Another advantage of the present invention is that all of the set-top boxes or other electronic equipment under test may be simultaneously switched to the same function by an infrared control system.

Throughout, reference may be made to set-top boxes, but it is understood without the specific reference each time to other electronic equipment that other electronic equipment may be tested using the present invention.

Another advantage of the present invention is that not only may all of the set-top boxes under test be simultaneously changed with respect to function, but also other equipment used in connection with the testing operation, such as televisions and audio receivers or the like may also be simultaneously controlled for each set-top box under test by an infrared control system.

Briefly and basically, in accordance with the present invention, an apparatus and method are provided for simultaneously testing multiple units of electronic equipment such as set-top boxes. The apparatus includes testing equipment structure for receiving a known good set-top box and a plurality of set-top boxes to be tested. In a presently preferred embodiment, eleven set-top boxes would be compared to a single known good set-top box. However, it is understood that various other numbers of boxes may be tested simultaneously such as six or twenty four. Further, the testing apparatus includes means for electrically connecting at least each set-top box to be tested by a single sliding motion. In a presently preferred embodiment all twelve set-top boxes, including the known good set-top box would be subject to a quick connect/disconnect means for electrically connecting the boxes. Infrared control means is provided which includes an infrared signal generator and a transmitter for set-top boxes for controlling the function of each set-top box such that the function of each set-top box is the same at each instant. Means are included for analyzing at least the audio and preferably the audio and video outputs of each set-top box being tested at a selected channel controlled by the infrared signal and comparing said audio and video outputs of the boxes being tested to the audio and video output of the known good set-top box. The apparatus further includes means for displaying, such as on a video monitor, the audio and video results for each set-top box being tested.

In accordance with the method of the present invention, a method of testing electronic equipment comprises the steps of providing a testing structure for receiving a known good set-top box and a plurality of set-top boxes to be tested. The method further includes enabling the plurality of set-top boxes to be electrically connected to the testing structure by a single sliding motion of each set-top box. Further, this method includes controlling the function of each set-top box by an infrared signal wherein the function of each set-top box is the same at each instant. The method includes running at least one diagnostic test on all of the boxes and simultaneously testing each of the set-top boxes for audio and video performance and displaying the diagnostic, audio and video test results for each set-top box.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 also illustrates an infrared controlled television for each set-top box.

FIG. 2 is a broken away perspective view of a quick connect/disconnect shelf structure of the present invention where electrical connections are made by sliding movement caused by the operation of a lever. A set-top box is illustrated in phantom lines.

FIG. 3 is a plan view, partially in cross section of the quick connect/disconnect structure shown in FIG. 2 illustrating the set-top box in phantom lines being electrically connected as a result of the lever causing the shelf structure containing the set-top box to be moved rearwardly.

FIG. 6A is a cross sectional view taken along line 6A-6A of FIG. 6.

FIG. 6B is a cross sectional view taken along line 6B-6B of FIG. 6.

FIG. 6C is a cross sectional view taken along line 6C-6C of FIG. 6 and includes an exploded view of a portion thereof as illustrated.

DETAILED DESCRIPTION OF THE PREFERRED EMBODIMENTS

Figure 1:
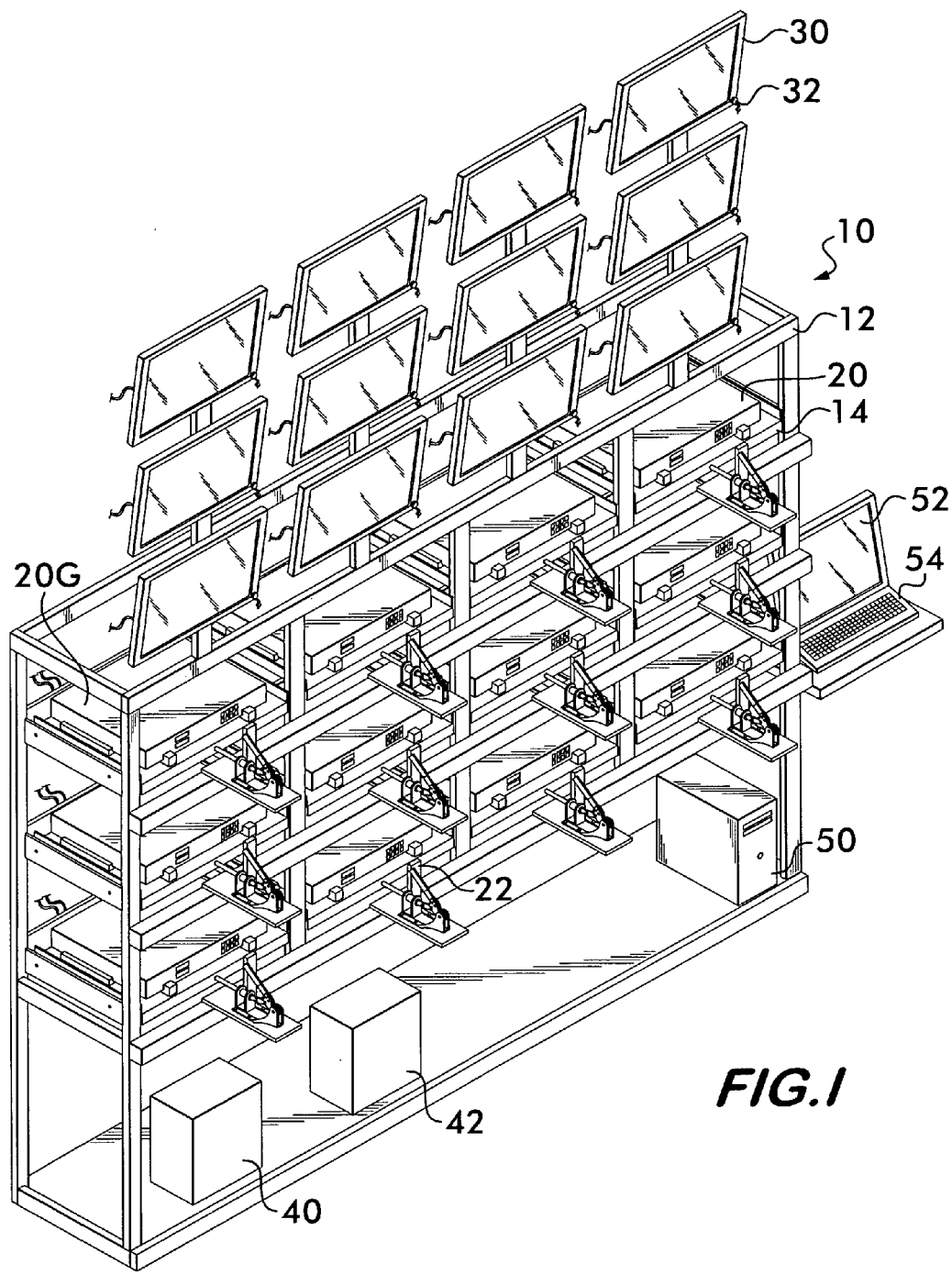
FIG. 1 is a view in perspective of a test structure for simultaneously testing a plurality of set-top boxes which includes a computer controller, mounting structure for the plurality of set-top boxes to be tested which is illustrated as eleven test boxes against the performance of one good known set-top box.

Referring now to the drawings, wherein like numerals indicate like elements, there is shown in FIG. 1 an apparatus 10 for simultaneously testing multiple units of electronic equipment such as set-top boxes 20. Reference throughout will be made to set-top boxes, but it is understood that the present invention may be utilized for simultaneously testing multiple units of other types of electronic equipment against a known good piece of electronic equipment. The multi set-top box tester is comprised of a structure or frame 12 having a plurality of shelves 14 for receiving set-top boxes 20. The shelves 12 are adjustable to receive various sizes of set-top boxes and are movable by slidable movement in a direction such as rewardly and forwardly to make all of the necessary electrical connections in a single sliding movement. The structure and operation of the shelves and the making and breaking of electrical connections will be discussed more particularly with respect to FIGS. 2 through 6.

FIG. 1 illustrates a presently preferred embodiment of the present invention wherein a good known set-top box 20G may be used as a standard to which the outputs and functioning of eleven set-top boxes to be tested are to be compared. Reference numeral 20 designates all set-top boxes including known good set-top box 20G unless otherwise specifically indicated. Further, although the good set-top box is illustrated in FIG. 1 as being in the upper left corner shelf, it is understood that the good set-top box may be placed on any one of the shelves so along as the tests are performed against the output connections of the good set-top box and the operator knows which box is the good set-top box shelf.

Also illustrated in FIG. 1 are twelve television sets 30, one for the output of each set-top box 20.

Each set-top box is controlled by an infrared transmitter 22 and each television 30 is controlled by an infrared transmitter 32. Audio analysis equipment 40 is also controlled by infrared signals. The infrared signals as well the operation of the testing of the set-top boxes is carried out under the control of computer 50 which includes a video display 52 and keyboard 54.

In summary, FIG. 1 depicts apparatus 10 for simultaneously testing multiple units of electronic equipment such as set-top boxes 20 which includes test equipment structure or frame 12 for receiving a known good set-top box 20G and a plurality of set-top boxes 20 to be tested. Further it illustrates means for electrically connecting at least each set-top box to be tested by a single sliding motion. Further FIG. 1 illustrates infrared transmitters 22 and 32 utilized to control both the set-top boxes and the televisions, respectively, which are controlled by computer 50. The multiple set-top box tester 10 also includes circuitry for analyzing the audio and/or video output of each set-top box being tested at a selected channel controlled by the infrared signal and comparing the audio and/or video outputs of the units being tested to the audio and/or video outputs of the known good set-top box 20G and displaying the audio and video test results for each set-top box being tested on video display 52.

Referring now to FIGS. 2 through 6 taken in conjunction with FIG. 1, there is shown in greater detail shelf 14 moveably or slidably mounted to frame 12 for holding or receiving set-top box 20 (in dotted outline). Set-top box 20 is received between adjustable guides 16 and 18, which are fixed for a particular set-top box. However, if a different size of set-top box is to be used, these guides 16 and 18 may be adjusted width wise by adjustment of mounting screws in slots 24 and 26, respectively. Shelf 14 is moveable in the directions of double headed arrow 28, by reason of the shelf slider glides 34, 36 best seen in FIG. 5. Conventional slide or glide drawer structure used for drawers and moving shelves may be used. Other suitable sliding or gliding structure may be utilized for the movement of shelf 14 with respect to frame 12.

Referring now more particularly to FIGS. 2 and 3, there is shown on shelf 14 adjustable blocks or clips 42 and 44 which engage the front of set-top box 20. Preferably blocks 42 and 44 as illustrated may be made of nylon, Teflon, polyurethane or other suitable non-marring material for insertion and removal of set-top boxes without scratching or marring the surface of the box. However, any suitable block or clip may be utilized to engage the front of box 20. Furthermore, blocks or clips 42 and 44 are fixed for a particular set-top box but may be adjusted by loosening their mounting screws or other fasteners, adjusting the position of the blocks or clips 40 and 42 and then retightening the fasteners in adjustment slots 46 and 48.

Figure 4:
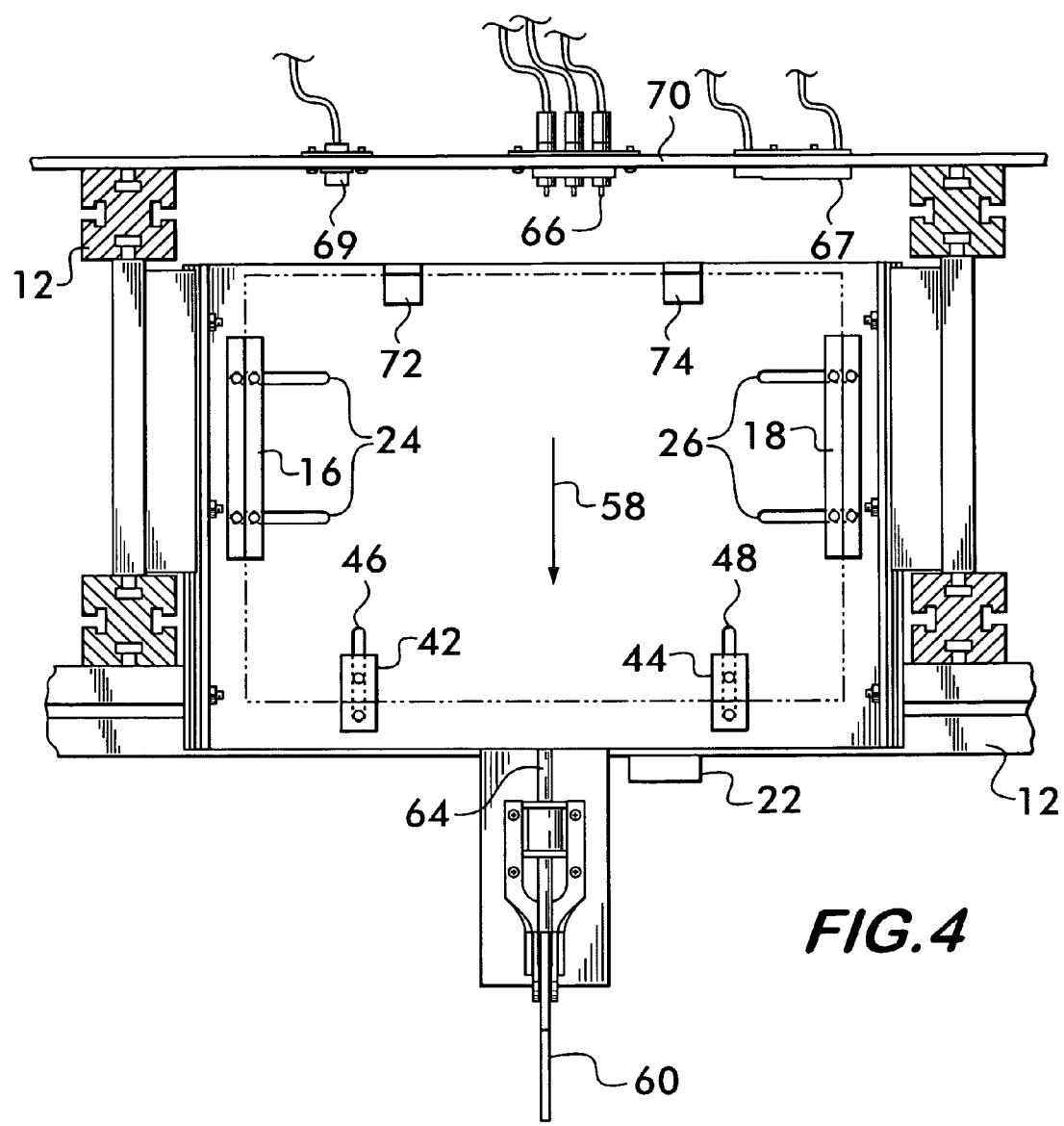
FIG. 4 is a plan view, partially in cross section of the quick connect/disconnect structure of FIG. 2 wherein the electrical connections are broken by a sliding movement of the shell forward as a result of operation of the lever in a forward direction.
Figure 5:
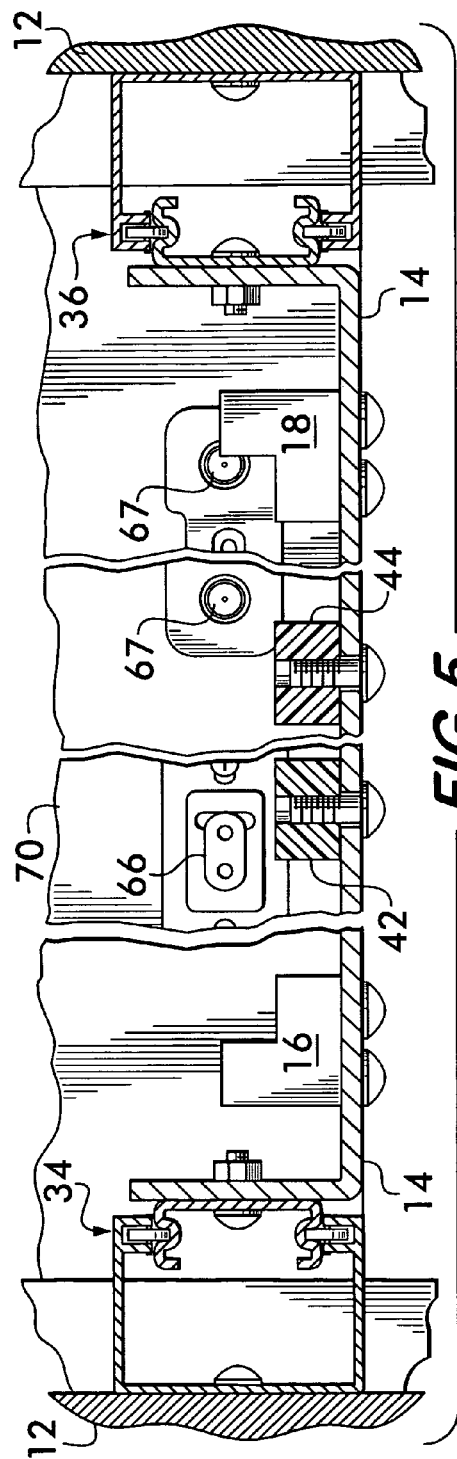
FIG. 5 is a cross sectional view, partially broken away of the structure taken along line 5-5 of FIG. 3.

Shelf 14 may be moved forwardly in the direction of arrow 58 shown in FIG. 4 or rewardly in the direction of arrow 38 shown in FIG. 3 by operation of lever 60 which is pivoted at 52 and connected at a point along its length to connecting rod 64, the other end of which is connected to shelf 14. As illustrated in FIGS. 2 and 3, shelf 14 is in its rearward most position causing set-top box 20 to be forced backwardly causing the making of electrical connections on the back of set-top box 20 with electrical connections 66, 67, 69 on backplane 70. Movement of lever 60 in the direction of arrow 68 causes shelf 14 and set-top box 20 engaged by clips 72 and 74 to be moved forwardly breaking the electrical connections between connectors 76, 77, 79 on the back of the set-top box 20 (best seen in FIG. 6) and electrical connector 66, 67, 69 on backplane 70. Set-top box 20 positioned in its forwardmost position is best illustrated in FIG. 4 where it is moved in the direction of arrow 58. The electrical connectors 66, 67, 69 on backplane 70 are no longer electrically connected to the back of the set-top box 20.

Figure 6:
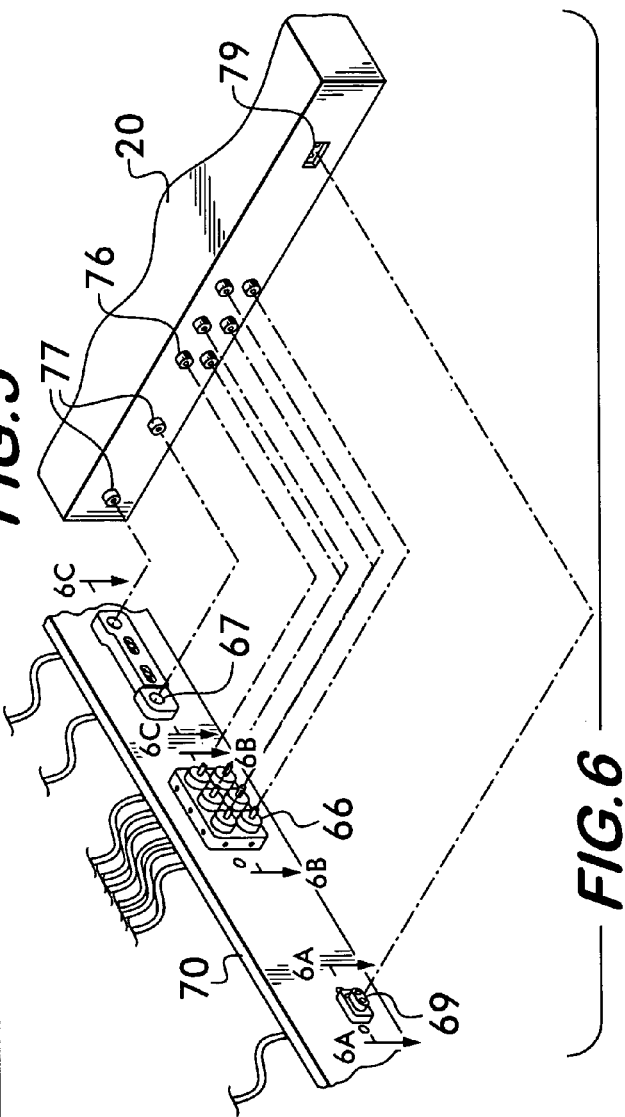
FIG. 6 is an exploded view of the electrical connections between the back of a set-top box and the backplane of the test structure.

As a part of the invention, a problem was discovered with respect to the fact that the electrical connections on the back of set-top boxes of each particular type may not all be precisely located in the same position from one box to the next, that is there may be very small variations due to tolerances and the like in the manufacturing process. This could cause problems in damaging connectors and/or other structure on the back of set-top boxes. A solution to this problem was discovered as a part of this invention in the form of providing a small degree of flexibility or mobility of the connectors on backplane 70. In accordance with the present invention, the flexibility or mobilibility of the connectors on the backplane may be provided in several ways. One way is by providing a resilient member between the actual connector and backplane 70, directly or indirectly. Backplane 70 may have connectors mounted within holes drilled or otherwise formed in backplane 70 with a resilient member such as rubber tubing, bushing or grommet secured between the connector and backplane 70 (or a connector block mounted to backplane 70). As best illustrated in FIGS. 6 and 6B, in a presently preferred embodiment, the connectors 66, which may be RCA type connectors, are mounted in a connector block 66B which in turn is mounted by screws or other fasteners 66F to backplane 70. The connectors 66 are mounted within a rubber or other resilient bushing or grommet 66R which may be secured in place by set screws 66S.

With respect to the power connector 69, a resilient member 69R is provided which may be a part of the normal connector or separately provided as best illustrated in FIG. 6A.

The problem of alignment is more acute with respect to RF or coaxial connectors in view of the relatively small and ductile or bendable center conductor of the coaxial connector. In this case as best illustrated in FIG. 6C, as the coaxial connectors 67 in backplane 70 were mounted using a back plate 67B, a front guide plate 67G and two quick connect/disconnect adaptors such as F type coaxial connectors 67F to form two floating coaxial connectors on backplane 70. In a presently preferred embodiment, although other similar structures may be utilized, an F type coaxial connector 67F, which is a slidable coaxial connector having an enlarged plug and a threaded neck is mounted such that the plug end 67P of the F type coaxial connector 67F is mounted to be received within a tapered bore 67T in front guide plate 67G. Front guide plate 67G and back plate 67B are attached such that they clamp to backplane 70 by tightening screws or fasteners 67S, the backplane 70 passing between the back plate 67B and the front guide plate 67G. The back side of the F type coaxial connector is secured in place by the back plate 67B loosely engaging enlarged knurled portion 67K (acting as a backward stop for the coaxial F connector), with the bore hole in the front guide plate 67G and the back plate 67B allowing sufficient freedom of movement such that the F connector plug 67F floats, is mobile or flexible between the front guide plate 67G and the back plate 67B to enable connection with the coaxial connector on the back of the set-top box even though there may be some variations in the precise location of the coaxial connector on the back of the set-top box.

Figure 7:
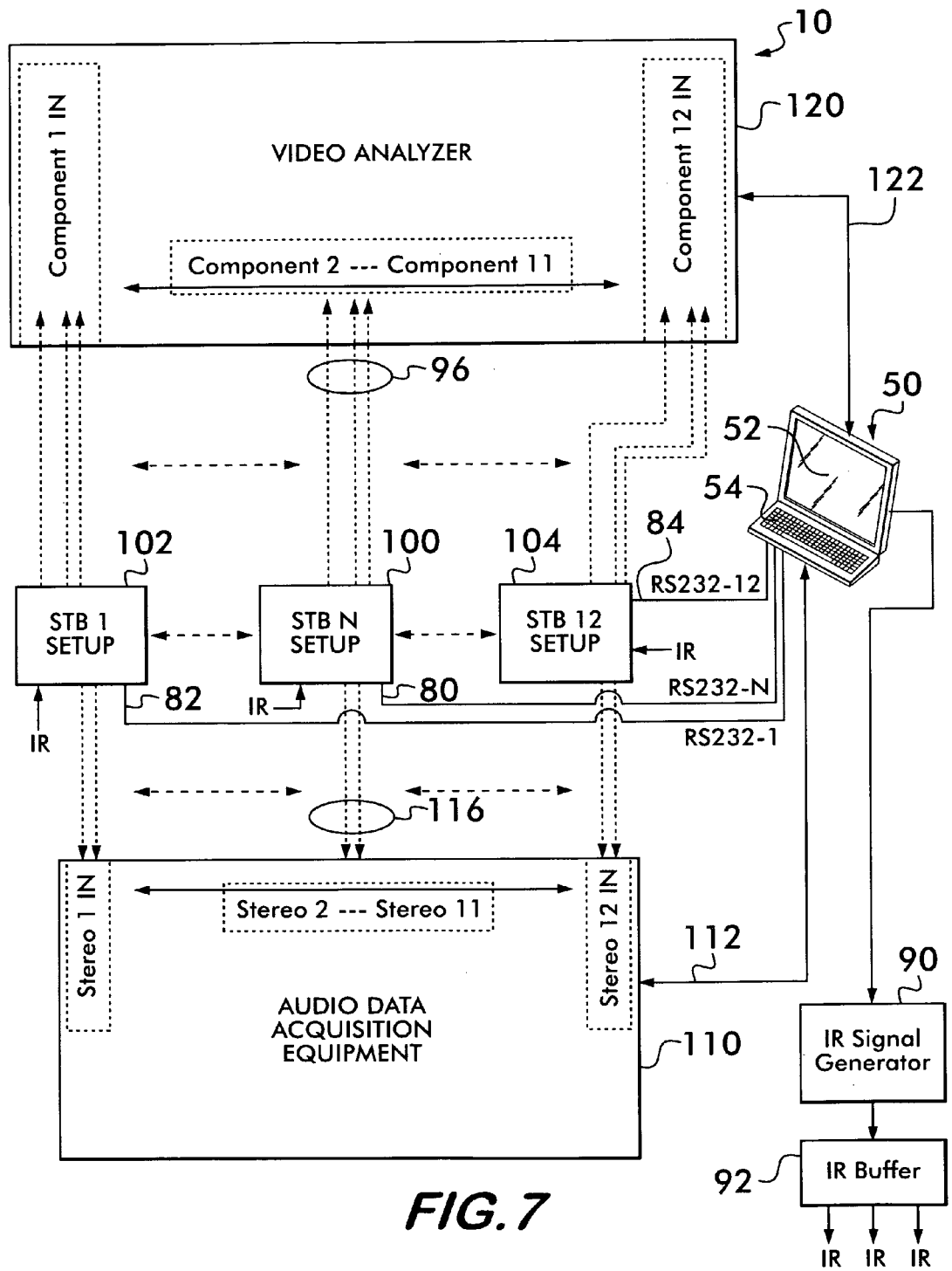
FIG. 7 is a schematic block diagram of the overall test circuitry for multiple set-top boxes, in the particular case illustrated twelve set-top boxes, with eleven being under test and one being a known good set-top box.
Figure 8:
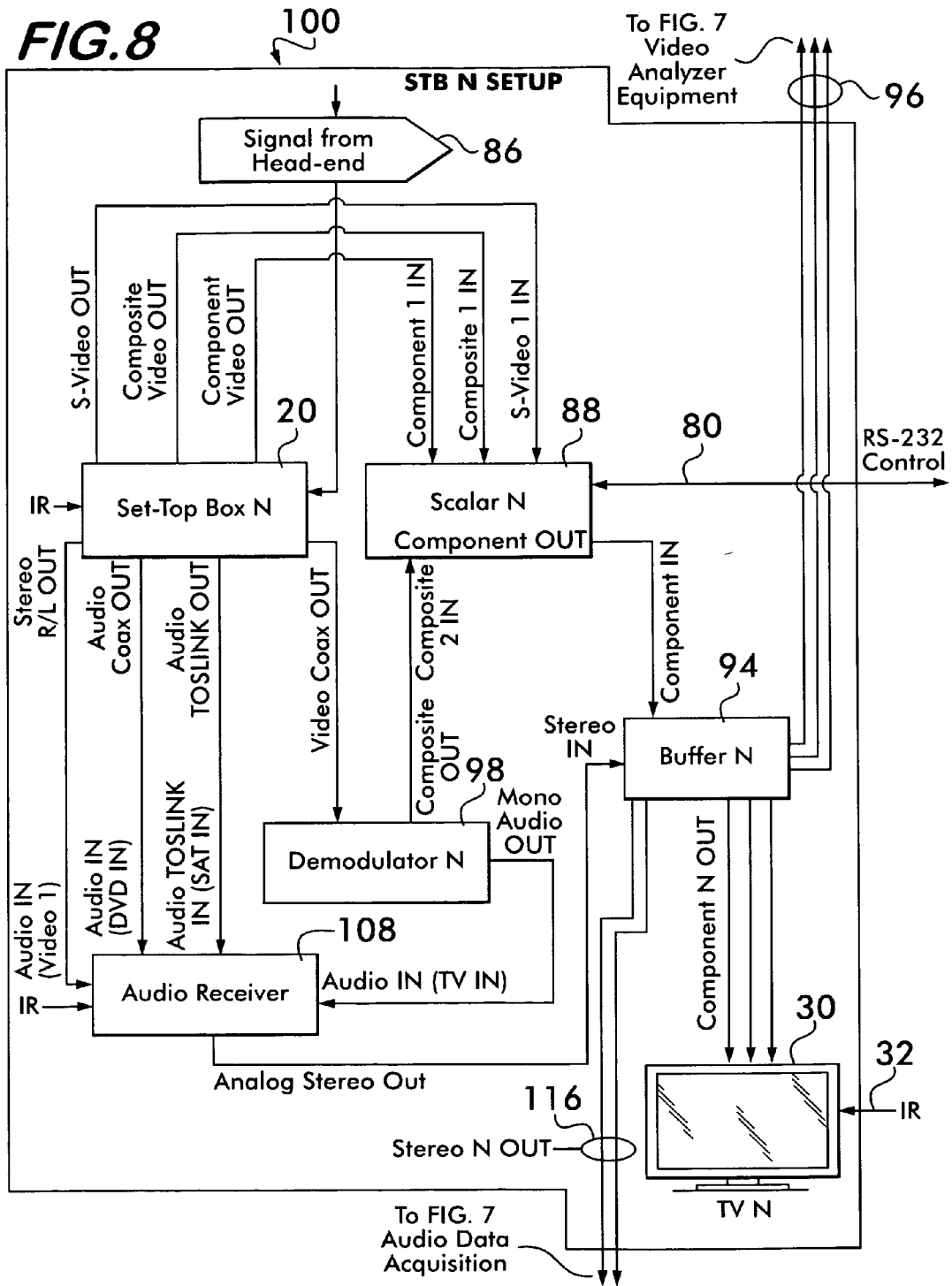
FIG. 8 is a schematic block diagram of the circuitry for one of the set-top boxes illustrated in FIG. 7, for the twelve set-top box circuits illustrated in FIG. 7, there would be twelve circuit arrangements as illustrated in FIG. 8.

Referring now to a schematic block diagram of the circuitry of the multiple set-top box test equipment 10 there is shown in FIG. 7 an overview of a multiple set-top box tester for an arrangement of testing 11 set-top boxes against one known good set-top box. However, again, it is emphasized that any suitable number of set-top boxes or electronic equipment may be tested against a known good set-top box or known good electronic equipment utilizing the present invention. FIG. 7 illustrates for each connected set-top box a set-top box N set up 100 and is labeled STB N SETUP. A block diagram of the circuitry for use in STB N SETUP is shown in FIG. 8. As illustrated in FIG. 7, there is an STB setup for each of the twelve connected set-top boxes, 11 being tested and one known good, indicated to run from STB 1 Setup 102 to STB 12 Setup 104. Each set-top box N setup, that is set-top box 1 setup through set-top box 12 set up operate under the control of computer 50 via RS-232 lines indicated at 80, 82 and 84 and an infrared signal controlled by computer 50 and generated in infrared signal (IR) generator 90 and distributed by IR buffer 92.

Referring now particularly to FIG. 7, each set-top box 20 in a STB N Setup is stepped through a sequence of tests, with all STB's one through 12 being subjected to the same test at the same time under the control of computer 50 via the RS-232 cables, such as RS-232 cables 80, 82 and 84. In one presently preferred embodiment, the STB's audio outputs are processed via audio data acquisition equipment 110 to be within certain predetermined limits and the results of which are fed via cable 112 to computer 50 for display on video display 52. The video may be tested by observation on the television 30 associated with each STB. In an alternate presently preferred embodiment, video analyzer equipment 120 may be utilized to analyze the video output of each of the set-top boxes 20 under test and compare it with the known good set-top box 20G output. The output of video analyzer 120 may be fed to computer 50 via line 122 for display on video display 52 or other suitable display including printing or storage. Video analyzer equipment 120 may be equipment commercially available, sold by K-Will Corporation of Torrance, Calif. 90502 under the trademark QU Max 2000 and sometimes referred to herein by the mark "CAPTURE ALL". Other suitable video analyzer equipment may be used.

Before discussing FIG. 8 in detail in connection with the operation of FIG. 7, please note that the preferred embodiment of the invention which utilizes video analyzer equipment 120 includes a video solution that compares video between the known good set-top box and eleven other units under test and obtains a pass or fail result. The video signals that can be tested include composite video, S-Video, component video and RF video and results in detection of Video Freeze Errors, Blackout Errors, Artifact Errors, Slice Errors, Content Mismatches in the signals and possibly others. The graphical user interface records the error and informs the user of these errors in the video signal. The tester also utilizes a computer control testing system that cycles through built in testing capabilities of the set-top box using infrared (IR) signals. An infrared relay system transmits parallel signals to twelve set-top boxes and twelve audio receivers in synchronization so that each set-top box is in the same test sequence through the entire test procedure.

In summary, as illustrated in FIG. 7, there are three main components of the testing system, namely the video analyzer which may be a Capture All unit or other suitable unit, the STB set ups and the audio data acquisition equipment device (Audio DAQ) or (ADAQ). The Audio DAQ device will be described hereinafter. The video analyzer or Capture All unit accepts twelve component video inputs from twelve set-top box Setups. Set-top box 1 (STB 1) setup component video output is used as a standard reference to which all other eleven STB's component video outputs are compared. For example, when the video equipment is the Capture All equipment, it uses its own built-in algorithm to analyze the differences in the component signals and sends the error information to the Capture All software running on computer 50. This results in detection of video freeze errors, blackout errors, artifact errors, slice errors, and content mismatches in the signal. Capture All software also reports the error types, the time of error and the information detailing the STB setup system (2 to 12) on which the error occurred.

Referring now to FIG. 8 taken in conjunction with FIG. 7, there is shown in FIG. 8 a block diagram of the circuitry and equipment contained in each STB N Setup of FIG. 7. In other words, for a tester 10 which tests eleven STB's against one known good STB, there would be twelve of the circuitry and equipment represented by FIG. 8. As illustrated in FIG. 8, STB N Setup is illustrated. Two way control signals between STB N Setup and the computer are delivered via line 80. Each STB N Setup includes a television 30 with an infrared transmitter for transmitting the control signals generated by infrared signal generator 90 under control of computer 50 and distributed by infrared buffer 92 which functions as a distribution amplifier.

A signal which emulates a typical signal fed to a set-top box under ordinary circumstances, such as a cable television signal is provided from a head end unit 86. This signal is applied to set-top box 20. Set top box 20 provides a plurality of output signals which need to be tested. These as illustrated are from left to right across the top of set-top box N 20, S-Video Out, Composite Video Out and Component Video Out which are fed to scalar N shown at 88. These three signals along with a composite signal generated from a video RF signal or video coax out signal are converted to or otherwise outputted as component video by scalar 88. The component video version of these signals is supplied through buffer N 94 and via lines 96 to video analyzer 120 in FIG. 7. Since video analyzer 120, particularly when it is a Capture All device, analyzes video only in component video form, scalar N 88 provides all video output signals in component video form. Scalar N 88 also receives from Demodulator N 98 a composite video signal generated from the video coax output of set-top box 20 which is converted to component video. Scalar 88 may be any suitable equipment which converts component, composite and S video signals to component video signals. One presently preferred suitable device for this application is a KDVPHD 3 unit sold by Key Digital Systems of Mount Vernon, N.Y. 10553. However, it is understood that other suitable converters may be utilized. Set-top box N 20 also provides several audio output signals, including stereo right/left out, audio coax out and audio TOSLINK out which is a digital signal which must be converted to analog for use by the video analyzer 120. The audio receiver 108 also receives a mono audio output from demodulator 98. Audio receiver 108 provides these audio signals in analog stereo output form to buffer 94 which provides them to audio data acquisition equipment 110 via lines 116. All of the testing is stepped through under the control of the infrared (IR) signals which as indicated in FIG. 8 are applied to the set-top box 20 audio receiver 108 and television 30.

At any single instant, only one video input (composite 1, composite 2, S video or component video) is selected on the scalar and that particular input is obtained on the output as a component video signal. This same scenario is followed in all twelve STB Setups and so that a particular instant of the testing using the preferred embodiment which includes the video analyzer, all twelve component video outputs of a STB Setup system will be using for example the composite video from the STB. At another instant, all twelve STB Setups component video outputs will be derived using S video or composite 2 video (originally RF video) or component video. The RF video from the STB is converted to composite video using a demodulator. The demodulator may be one commercially available from Pico-Macom of San Diego, Calif. 92121 under the trade name MPCD. The composite video is supplied as composite 2 video to the scalar which converts it to component video. The conversion of all video signals to component video is necessary because when using a Capture All unit, that unit only accepts component video signals for testing purposes. Prior to sending the component video signal to the Capture All or other video analyzer equipment, the signal is sent to buffer 94. Buffer 94 may be a distribution amplifier which allows the signal to be split into two copies. One signal is sent to the Capture All or video analyzer equipment 120 and the second copy is sent to television 30 for video viewing and troubleshooting purposes.

With respect to audio testing, the test equipment provides analog stereo output to the audio data acquisition equipment 110. All audio outputs from the STB, namely digital optical or TOSLINK audio, digital coax or S/PDIF audio are analyzed. The audio receiver converts and switches each input into analog stereo. At any single instant, only one video input (composite 1, composite 2, S video or component video) is selected on a scalar and that particular input is obtained on the output as a component video signal. The same scenario is followed in all twelve STB set ups and so at any particular instant of testing using the test equipment of the present invention, all twelve component video outputs of a STB set up system will be using for example composite video from the STB. At another instant all twelve STB set up component video outputs will be using S video or composite 2 video (originally (RF video) or component video.

Figure 9:
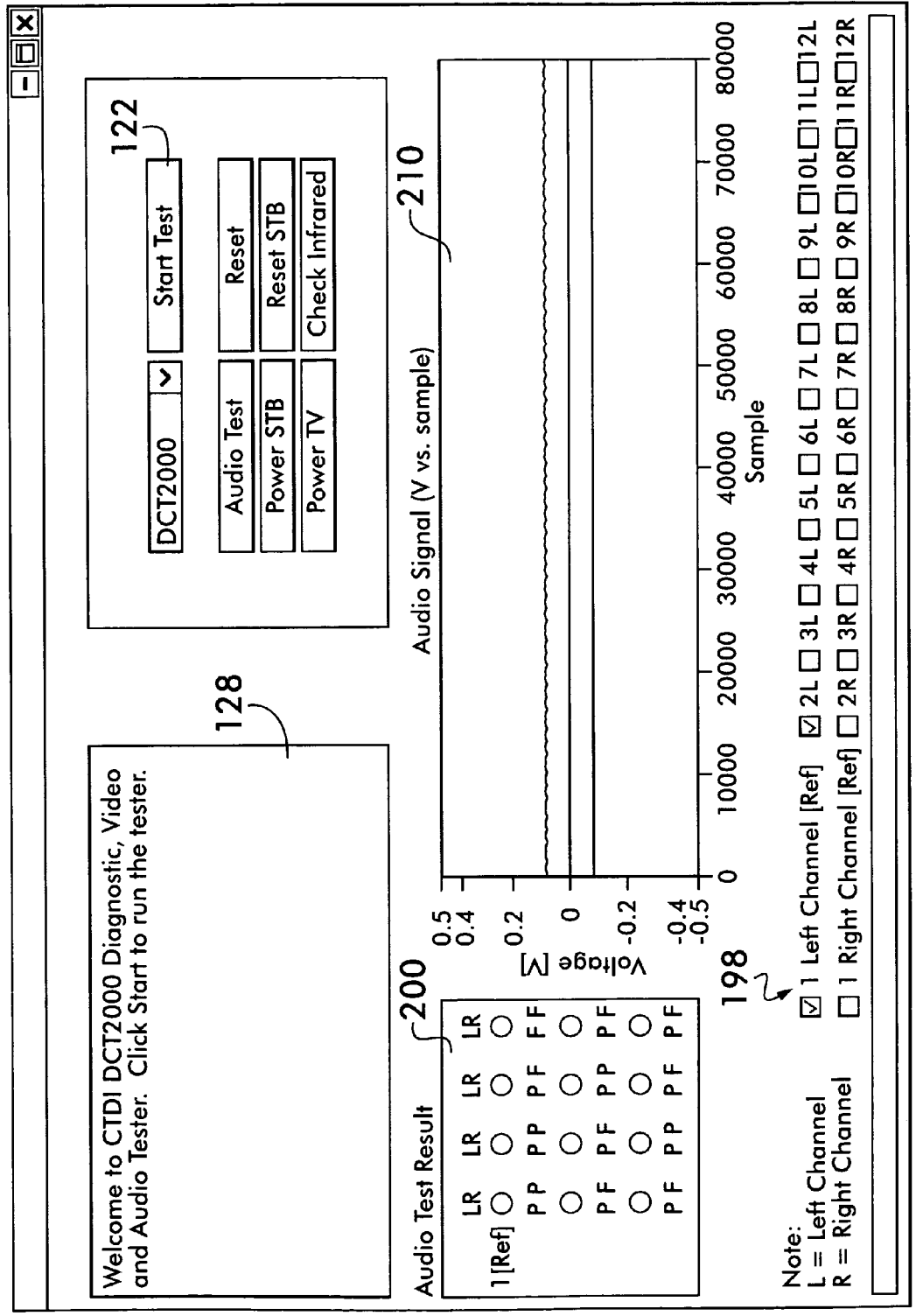
FIG. 9 is a graphical user interface or video display of a screen of the computer running the test at the beginning of the test.

FIGS. 9 through 12 represent drawings of typical screen displays of the graphical user interface displayed on video display 52 during the running of the test. FIGS. 13A and 13B represent a flow chart of the test as controlled by the program of computer 50. Referring now to FIGS. 9-12 and 13A and 13B, after a known good set-top box 20G is installed on shelf 1 and electrical connections are made by the operation of lever 60 and after eleven or other number of set-top boxes 20 to be tested are installed on the remaining shelves and electrically connected by the operation of their respective lever 60, the test is started by clicking on start test icon 122 illustrated in FIG. 9. Clicking on START TEST icon 122 initiates the Start Routine 124 illustrated in FIG. 13A. The next step in the program is to select the model and type of set-top box as illustrated by box 126 in FIG. 13A. Instructions to click start to run the tester are also given in display box 128 illustrated in FIG. 9. The graphical user interface displayed in FIG. 9 represents the beginning of the testing sequence.

Figure 10:
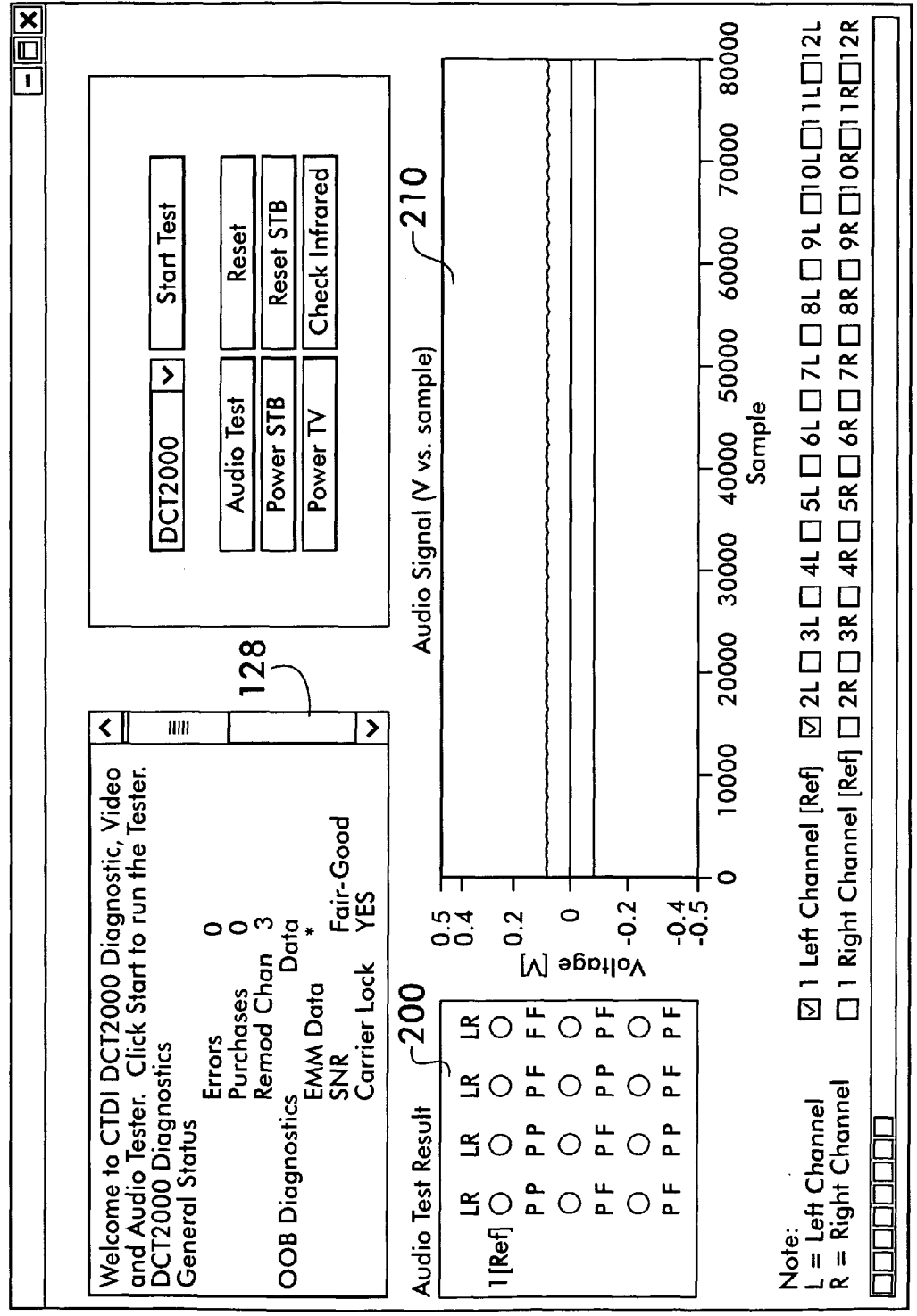
FIG. 10 is a graphical user interface or video display of the computer screen running the test during the diagnostic phase of testing.
Figure 11:
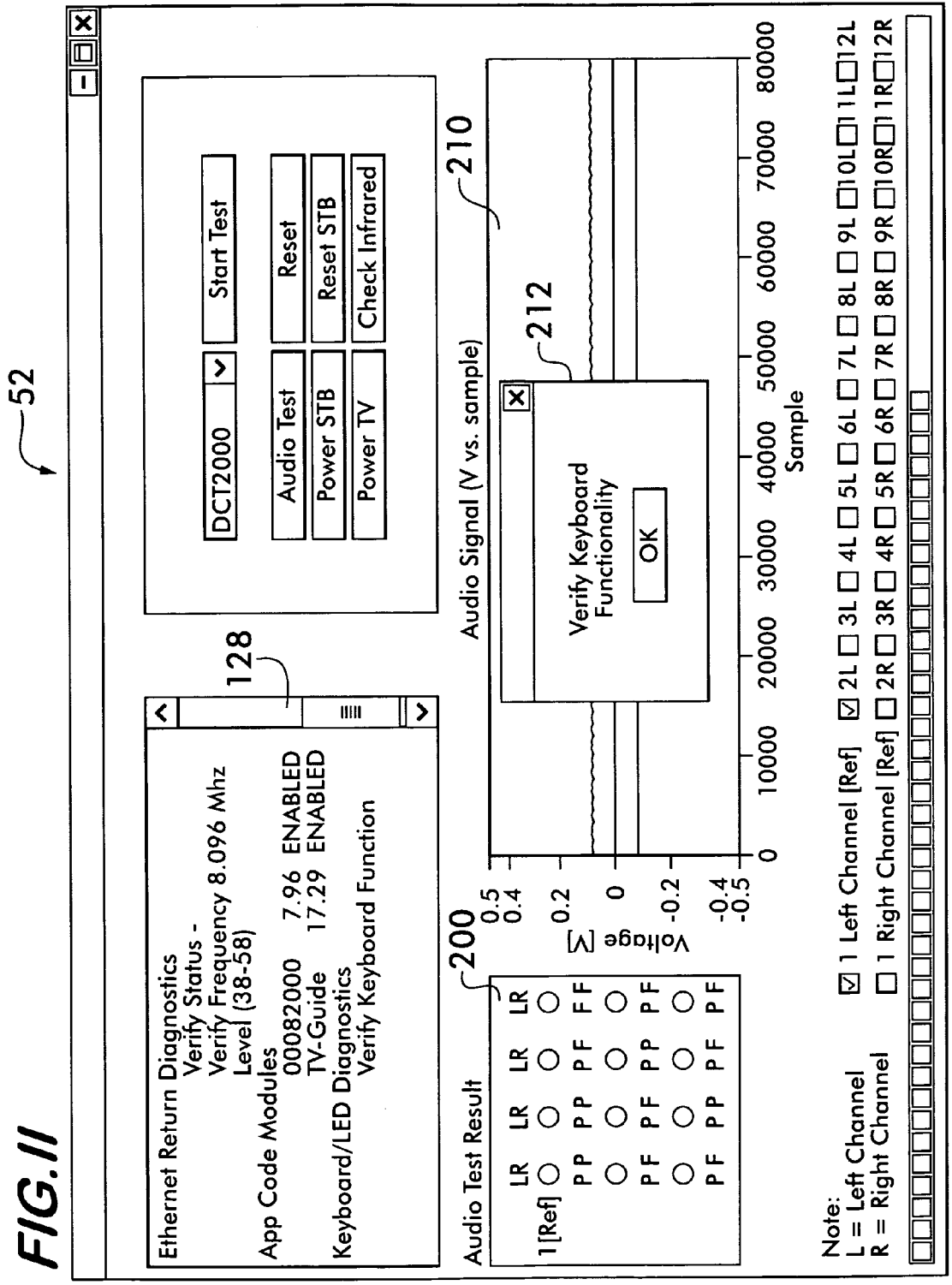
FIG. 11 is a graphical user interface or video display of the computer screen of the computer running a test at a later stage during the diagnostic testing.

Referring to FIG. 13A, the next step in the program is to send an infrared (IR) signal, switching the TV's to composite video as represented by rectangle 130 in FIG. 13A. The next step is to send the infrared signal to the power on all set-top boxes as represented by rectangle 132 in FIG. 13A. The next step is to run diagnostic tests as indicated by rectangle 132 in FIG. 13A and as illustrated on the graphical user interface represented in FIG. 10. The diagnostic test may be varied depending upon what is desired in the particular testing procedure. However, various tests which may be conducted, some of which are illustrated in FIG. 10 include an errors test which is a test to determine whether the set-top boxes internal testing program has detected any error on which an error signal has been generated. Another diagnostic test that may be run is whether there are purchases on the set-top box. By purchases, this means whether there are special video products recorded in the set-top box as having been purchased by the previous customer such as pay per view channels, such as HBO. These must all be set to zero if they are not already at zero. Another test that may be run is Out of Band Diagnostics (OOB) which tests whether the set-top box is communicating properly with the head end of the system. This will be indicated by an asterisk if it is good, or otherwise be indicated if it is poor. It will also display the signal to noise ratio (SNR) and that must be within a predetermined range for a particular box. As is known in the industry, OOB is out of band communications between the head end and the set-top box relating to purchases or other things, other than video entertainment signals. The next diagnostic test in a presently preferred embodiment is shown in the display panel 128 of the graphical user interface illustrated in FIG. 11 as Ethernet Return Diagnostics. Other tests may include In Band Diagnostics which will look for various factors such as carrier lock. It also measures the signal to noise ratio and also displays channel frequency. Another test may be the upstream status test that measures the capability of the set-top box to communicate with the head end. This displays the frequency used for this purpose. Another test may be as to whether the latest firmwear has been down loaded from the head end. The final diagnostic test may be to verify key board function. The test operator is prompted to verify the keyboard function by prompt 212 as illustrated in FIG. 11 on video display 52. The keyboard/LED diagnostic test prompts the operator to press each button on each set-top box and make sure that it is displayed as being operable on the television 30. Some of this is illustrated in panel 128 in FIG. 11.

The values for all of the tests that are run are displayed in a data display panel 128 on the display screen 52 which tells the operator what the test results need to be, that will be displayed on the screen of each television.

Referring again to FIG. 13A, after rectangle 134, the flow path is to decision diamond 136 as to whether the STB passed the test. If the answer is No, the flow path is to Fail rectangle 138. If the output of decision diamond 136 is Yes, the flow path is to whether all STB's were tested in decision diamond 140. If the answer is No on line 142, the diagnostic tests are continued in rectangle 134. If the answer or decision in diamond 140 is Yes, the flow path is to begin video and audio testing in rectangle 144.

Also, the output of fail box 138 is to decision diamond 146 where the decision is made as to whether all STB's were tested. If the answer is No on line 148, the test continue to be run per rectangle 134. If the output of decision diamond 146 is Yes, then video and audio testing begins in rectangle 144.

There are two output flow paths out of Video and Audio Testing Rectangle 144 which include initializing the audio data acquisition equipment as reflected in Initalize ADAQ block 150. The flow path out of initialized audio data acquisition 150 is via line 152 which continues on FIG. 13B. The other output out of video and audio testing rectangle 144 is via line 154 to rectangle 156 representing sending of infrared commands to the STB, TV and audio receiver setting the proper audio inputs. An important aspect of the present invention that all of the set-top boxes, televisions, receivers and the video channels are all controlled simultaneously by an infrared system which transmits the commands to all of the equipment to change to the appropriate inputs, outputs and proper function for the test then and there being performed. The output of rectangle 156 is fed via line 158 which continues on the top of FIG. 13B to box or rectangle 160 which is the sending of IR commands via RS 232 lines, switching appropriate inputs on scalar 88. Of course, by the present system, all twelve set-top boxes scalars are switched simultaneously. Similarly with respect to rectangle 152, all twelve set-top boxes, all twelve televisions and all twelve receivers are set simultaneously to the same setting for the proper audio testing.

On the left side of FIG. 13B, the flow path along line 152, after initializing the audio data acquisition equipment (ADAG), control or flow proceeds to box 162 wherein each signal is received for twelve set-top boxes (twenty four channels counting the left and right channels) for five seconds. From there in box 164 the audio outputs of the eleven STB units under test are compared with the output of the known good set-top box unit. That is twenty two channels, counting left and right of the eleven set-top boxes under test are compared with the two channels (left and right) of the known good set-top box. As will be described hereinafter, the operator via the program may select an upper and lower limit of the audio envelope of the known good set-top box and the two outputs of each of the eleven set-top boxes under test must fall within the upper and lower envelopes in order to pass the test. As reflected by box 166, the audio is analyzed for five seconds. In decision rectangle 168 the decision is made as to whether the STB under test failed the test. If the answer is Yes, it is directed to the failed box rectangle 170. If the STB did not fail, the test then the flow path continues to where all set-top boxes tested in decision diamond 172. If the answer is No, then via line 174 the flow path continues back to initialize audio data acquisition box 150 and the audio testing continues. If in decision diamond 172, the output is that Yes all STB's were tested, then the results are displayed as indicated by box 176. The audio test results may be displayed in Audio Test Result display panel 200, for example shown in the lower left of FIGS. 9 through 12. In the arrangement being illustrated, 1 is the reference or known good set top box and that is indicated in the left of the panel 200. Also indicated for each box a left channel and a right channel by the letters L and R, respectively. For each box there is a light emitting diode LED which is lighted green if both the left and right channels are good and is lighted red if either or both of the channels fails. It is also indicated in panel 200 as to whether the left or right channel fails. A failure is represented by a F and a pass by a P. Particular audio signals for a particular number of samples per five seconds may also be illustrated in Audio Signal (V vs. Sample). This is a display in which the audio signal may be displayed. The numbers across the bottom such as 10,000, indicate the number of samples of the audio signal taken per a five second interval. As an example, the signal may have to be within a range of −0.2 volts to 0.2 volts. As illustrated in FIG. 9 at 198, by clicking on the selection on the bottom, the bottom of display screen 52, the particular channels to be illustrated in panel 210 are selected by clicking and placing check marks in the box before the channel indicator. For example, as illustrated in FIG. 9, left channel of STB1 and the left channel of STB2 are illustrated on display panel 210. In FIG. 13B, from box 176 the last step is to reset the set-top boxes to factory settings as indicated by box 178.

Referring back now to the video testing path out of box 144 via line 154, the flow path continues through boxes 156 and 160 as previously described and then continues to box 180 which is the initialization of the video analyzer 120. As reflected by box 182 the video is then analyzed for five seconds. From there, in decision diamond 184, a decision is made as to whether the STB passed the test. If the decision is No, the flow path goes to Fail box 186. If the decision is Yes, then the flow path is to decision diamond 188 where a decision is made as to whether all STB's were tested. If the answer is No, the flow path is via line 190 back to box 156 on FIG. 13A where the video testing continues. If the answer in decision diamond 188 is Yes then the results are displayed as indicated by box 192 on video display 52. From box 192, the flow continues to box 178 where the STB is reset to factory settings.

Figure 12:
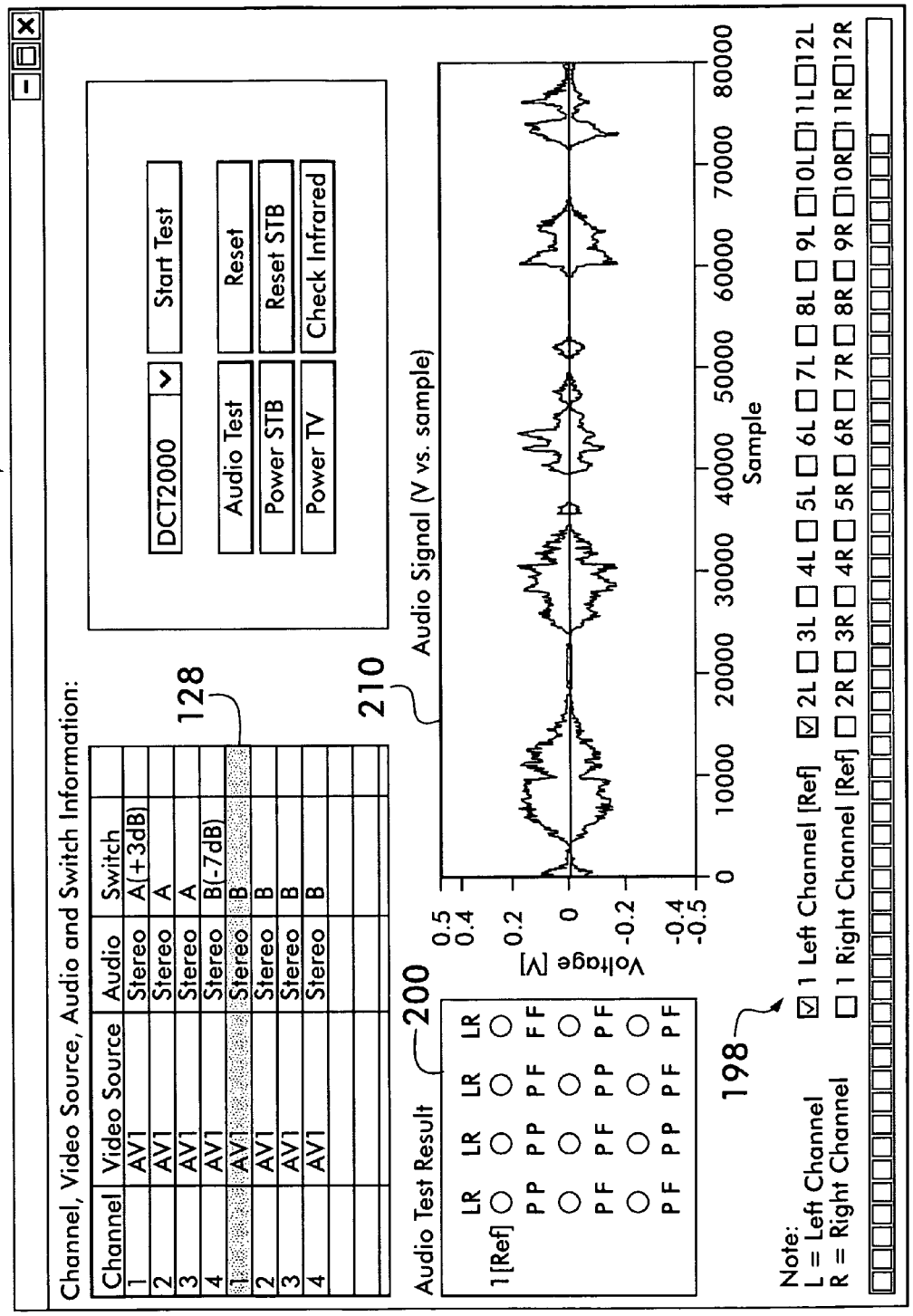
FIG. 12 is a graphical user interface or video display screen of the computer running a test during the audio testing phase.
Figure 13A:
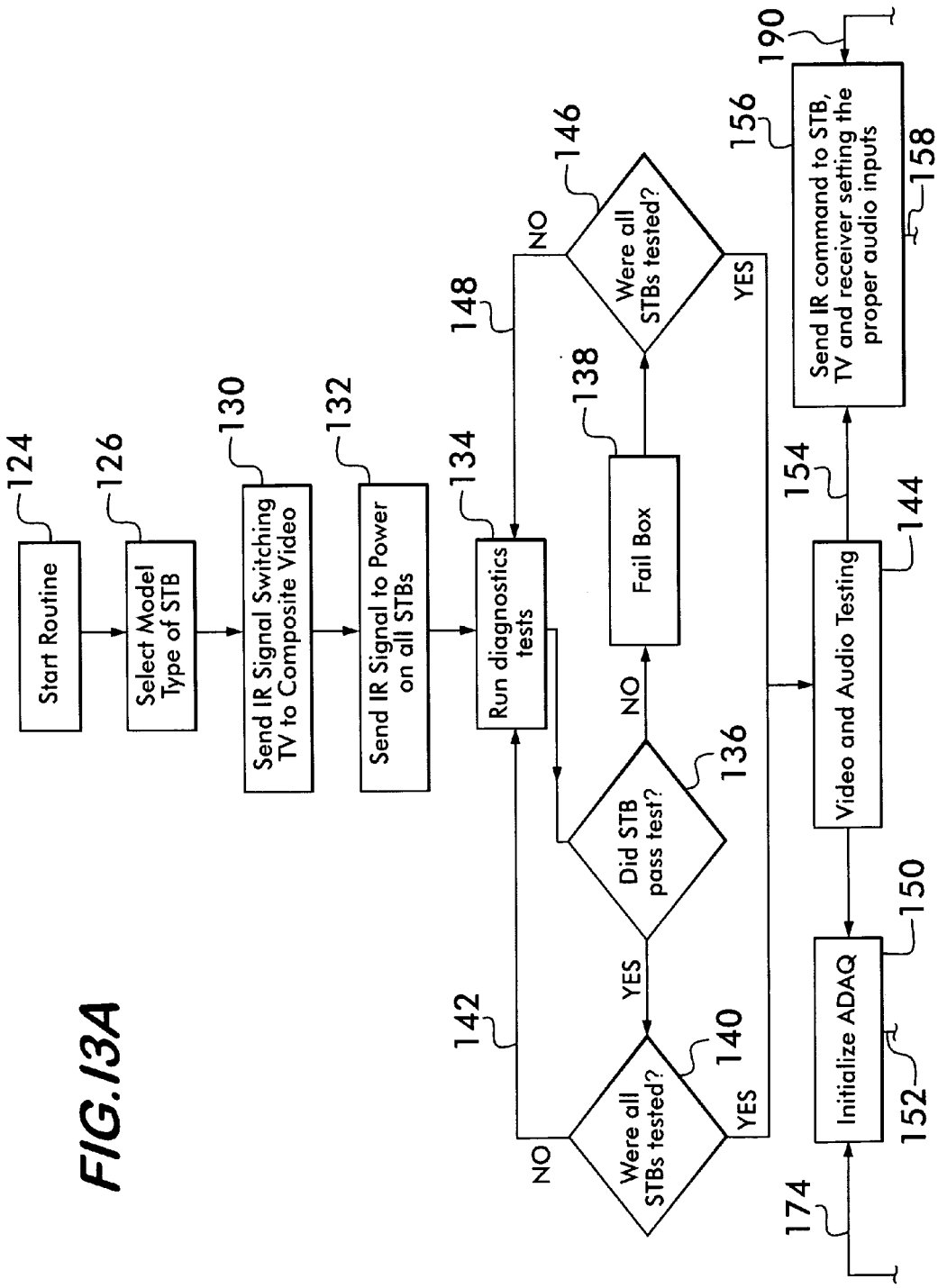
FIGS. 13A and 13B comprise a flow chart of the operation of the test equipment of the present invention.
Figure 13B:
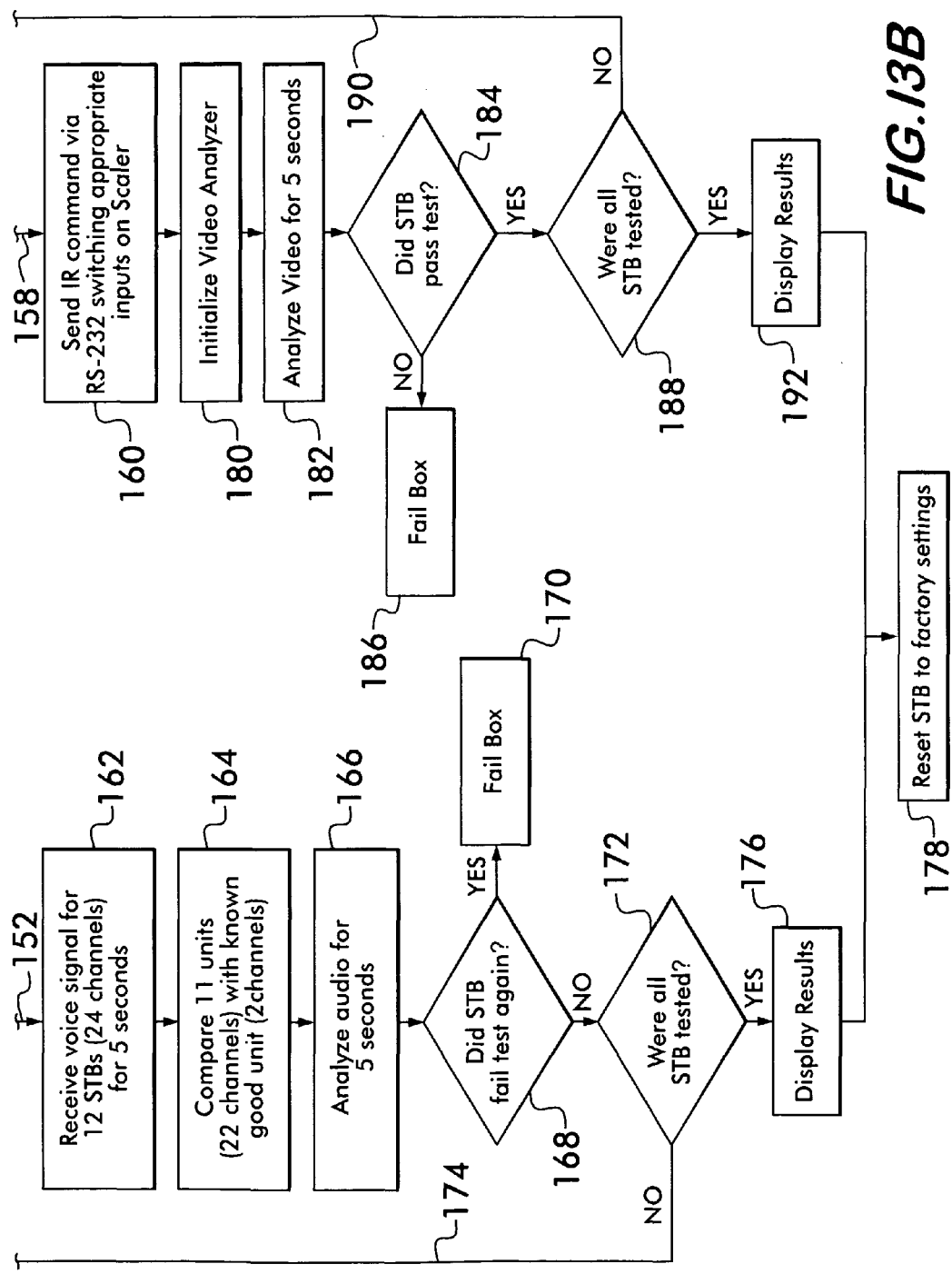

Graphical user interface as illustrated in FIG. 12 displays the channel, video source audio and switch information in panel 128. The channels there indicated are channels 1 through 4 but these will represent different frequencies, not necessarily channels 1 through 4. Usually, these are selected to be a low, medium and high frequency, which in this art may be referring to frequencies in the range of 189 MHz to 891 MHz. However, it is understood that various channels may be selected for testing as is desired in the test protocol desired. The video sources also indicated as indicated in panel 128. The type of audio is indicated as to whether it is stereo, and the switch position which tests the boxes both for low power and high power. The different powers are derived by switching in different values of attenuators. As illustrated in FIG. 12 in panel 210, the audio output of each channel may be selected to be displayed showing the audio signal verses the sample rate.

In Audio Test Result display panel 200, LED lights or other suitable lights may indicate red or green. The light is lighted green if both the left and right stereo channel pass. If one or both of the channels fail, the LED lights red.

Referring back to FIG. 13B, the rectangles 180 and 182 may be done manually. In other words there may not be a video analyzer, but the video results may be displayed on the television screen and the operator may judge the suitability of the video for passing or failing the set-top box.

Further summary with respect to the audio testing is that the audio data acquisition equipment may use one National Instrument's (M) cDAQ-9172 and Six NI 9215 devices or equipments to collect twenty four audio output signals in a presently preferred embodiment. However, it is understood that other equipment may be utilized. Each set-top box has one left audio channel and one right audio channel. With the capability of collecting twenty four audio output signals, the audio test is able to test twelve set-top boxes simultaneously.

In a presently preferred embodiment the NI cDAQ-9172 is an eight slot chassis. It may hold up to eight C Series I-O modules, including NI 9215 modules. The chassis is a USB 2.0 compliant device. The NI 9215 is a data acquisition device. It provides four channels of 16 bit simultaneous sampling analog inputs. With a USB interface, it can provide 100 kS/sec per channel sampling rate.

Test apparatus captures all twelve set-top boxes audio output signals simultaneously. One set-top box, in the example illustrated, number 1 is treated as the known good set-top box which provides a good left audio output signal and a good right audio output signal. Two envelopes, a low envelope and a high envelope are created from the good left audio output signal and a low envelope and a high envelope are also created from the good right audio output signal. The other eleven set-top boxes left audio output signals are compared to the low and high left envelopes. The left audio output signal is considered good if it falls between the low and high left envelopes. In a similar manner, the right audio outputs of the eleven set-top boxes are compared with the low and high envelopes of the right known good set-top box right audio output. They also pass if they fall within the low and high right envelopes.

There are twelve indicators on the graphical user interface in panel 200. Each LED represents one set-top box. For example, the LED which may be labeled two represents the set-top box number two. The LED turns green if the set-top box left and right audio channels pass the test. The LED turns red if the left or right or both of the audio channels fail the test. The graphical user interface or video display 52 also displays the chosen audio signal versus number of samples taken per 5 seconds in panel 210. The graph is plotted in voltage verses sample rate. It allows the user to choose which set-top box audio signal to display. The user can choose to display only one audio output signal, more than one or all audio output signals.

It is understood that various modifications and changes may be made to the foregoing description of the presently preferred embodiments without departing from the scope and spirit of the present invention. For example, the sampling interval may be more or less than five seconds. Different power levels may be utilized. Different frequency ranges may be tested and used. Various types of equipment may be tested other than set-top boxes. Numerous variations will be apparent to those skilled in the art as falling within the claimed concepts of the present invention The present invention may be embodied in other specific forms without departing from the spirit or essential attributes thereof and, accordingly, reference should be made to the appended claims, rather than to the foregoing specification as indicating the scope of the invention.

We claim:

1. Apparatus for simultaneously testing multiple set-top boxes, comprising:
    means for slideably making all electrical connections to at least the plurality of set-top boxes to be tested against a known goods set-top box in a single sliding action for each set-top box where the electrical connections are slidably made;
    a computer program for controlling testing of said set-to boxes; a television set for each of said set-top boxes connectable to selected outputs of each set-top box in response to said computer program;
    a video analyzer for receiving a video output signal directly or indirectly from each of said plurality of set-top boxes being tested and comparing said video output signal with a corresponding video output signal of said known good set-top box under control of said computer program;
    audio data acquisition means for receiving directly or indirectly an audio output signal from each of said plurality of set-top boxes being tested and comparing said audio output signal to a corresponding audio output signal of said known good set-top box under control of said computer program;
    an infrared signal wherein said audio data acquisition means is an analog audio analyzer which captures an envelope of an audio segment of an audio output of said known good set-top box and of said set-top boxes under test and compares an envelope of an audio signal for the same period of each set-top box under test to determine whether the envelope of audio of each set-top box under test is within a selected predetermined upper limit and a selected predetermined lower limit of the audio envelope of the known good set-top box; processor for sending test control signals for application to an infrared transmitter mounted juxtaposed each set-top box and television set for controlling the test so that each set-top box and television is set to the same function in each step of a testing procedure; and wherein said means for slideably making all electrical connections includes a moveable shelf for each set-top box, said shelf being adapted to receive a set-top box thereon and including means for right and left alignment and means for restraining forward and backward movement of said set-top box on said shelf, said shelf with a set-top box thereon may be moved backwardly to make electrical connections and forwardly to break electrical connections between connections on a back of the set-top box and connections on a backplane.

2. An apparatus in accordance with claim 1 including a receiver for each connected set-top box to convert any digital audio output of a set-top box to an analog signal to be fed directly or indirectly to said audio data acquisition means.

3. An apparatus in accordance with claim 1 wherein said computer program causes at least all set-top boxes under test to undergo a first diagnostic test.

4. An apparatus in accordance with claim 3 wherein said computer program causes all set-top boxes under test to undergo a second diagnostic test after completion of said first diagnostic test.

5. An apparatus in accordance with claim 1 wherein said computer program tests a first selected video output and a first selected audio output of each set-top box under test at a first selected channel, said first selected video output, said first selected audio output and said first selected channel being implemented by transmission of infrared signals via said infrared processor under control of said computer program and said infrared transmitter.

6. An apparatus in accordance with claim 5 wherein said computer program selects as a second test for all connected set-top boxes a second predetermined video output, audio output and channel for all connected set-top boxes such that each set-top box is controlled via the infrared signal such that each has the same video output, audio output and channel selected.

7. An apparatus in accordance with claim 1 wherein said shelf is moved backwardly to make electrical connections and forwardly to break electrical connections by means of a lever mounted between said shelf and a frame supporting said shelf.

8. An apparatus in accordance with claim 1 wherein at least one of said electrical connectors on said backplane are fitted with a resilient bushing between an electrical connector and its mounting to said backplane.

9. An apparatus in accordance with claim 1 wherein said computer program is operative in a computer wherein means are provided for selecting the model type of set-top box to be tested.

10. An apparatus in accordance with claim 1 wherein said plurality of set-top boxes being tested against a known good said set-top box is eleven.

11. An apparatus in accordance with claim 1 including a scalar for connecting composite and s-video outputs of a set-top box to component video before being fed to said video analyzer.

12. An apparatus in accordance with claim 11 including a demodulator for each set-top box for converting an RF coaxial output of each set-top box to composite video for inputting to said scalar.

13. An apparatus in accordance with claim 1 wherein said infrared signal processor for sending test control signals includes means for generating multiple copies of each test control signal.

14. An apparatus for simultaneously testing multiple set-top boxes, comprising:

test equipment structure for receiving a known good set-top box and a plurality of set-top boxes to be tested, each set-top box having an input with an RF coaxial connector and audio and video outputs with RCA type connectors, each set-top box having a plurality of channels and being capable of interactive communication enabling purchasing, said set-top boxes providing multiple video outputs for each video input;

means for electrically connecting to said input RF coaxial connector and said video output RCA type connectors of at least each set-top box to be tested by a single movement;

infrared control means including an infrared signal generator and a transmitter for each set-top box for controlling the function of each set-top box such that the function of each set-top box is the same at each instant, once all set-top boxes are on the same function, said infrared control means steps a comparison of the output of each set-top box to be tested to the output of the known good set-top box, said infrared control means stepping through channels of video, audio and diagnostic functions;

means for sequentially analyzing at least the audio output of each set-top box being tested at a selected channel controlled by said infrared signal and comparing said audio outputs to the audio output of said known good set-top box, said analyzing means including means for capturing a segment of the audio output of said known good set-top box, creating for said segment an upper limit of performance envelope, creating a lower limit of performance envelope and said comparing of said audio outputs of the set-top boxes to be tested to the audio output of said known good set-top box being determined by whether the audio output of each set-top box under test for the same period of time falls between said upper performance envelope and said lower performance envelope of said known good set-top box; and displaying the audio test results for each set-top box being tested.

15. An apparatus in accordance with claim 14 including means for analyzing the video output of each set-top box being tested at a selected channel controlled by said infrared signal and comparing said video outputs to the video output of said known good set-top box.

16. An apparatus in accordance with claim 14 including means for performing at least one diagnostic test simultaneously on each set-top box.

17. An apparatus in accordance with claim 14 wherein said means for electrically connecting at least each set-top box to be tested by a single movement includes mounting structure for mounting each set-top box on a movable shelf, movable in one direction to make a connection and movable in an opposite direction to break the electrical connection.

18. An apparatus in accordance with claim 17 wherein said means for electrically connecting includes electrical connectors moveably mounted on a backplane wherein said electrical connectors may adjust their position to mate with connectors on the back of a set-top box.

19. An apparatus in accordance with claim 18 wherein said electrical connectors mounted on said backplane are provided with a resilient member mounted between the connector and said backplane.

20. An apparatus in accordance with claim 18 wherein said connectors mounted on said backplane are connectors mounted to float between a back plate mounted to the back side of said backplane and a front guide plate mounted to the front side of said backplane.

21. Apparatus for testing multiple set top boxes, comprising:
 a testing structure with a plurality of shelves for receiving a known good set-top box and a plurality of set-top boxes to be tested;
 at least each shelf for receiving a set-top box to be tested having means for positioning a set-top box on each shelf;
 each set-top box having at least a plurality of RCA type connectors and an F type coaxial connector on the back of each set-top box;
 said testing structure having a backplane with at least a plurality of RCA type connectors and at least one F type coaxial connector;
 said means for positioning a set-top box on each shelf aligning each set-top box so that the RCA type connectors on the set-top box line up with the RCA type connectors on the backplane and the F type connector on the back of the set-top box lines up with the F type connector on the backplane;
 said shelf being movable in a first direction so that plurality of RCA type connectors on each set-top box electrically connect to said RCA type connectors on said backplane and said F type connector on said set-top box connects with said F type connector on said backplane;
 each of said RCA type connectors on said backplane being mounted in a resilient material such that each is moveable relative to the other;
 said F type connector on said backplane being mounted between and spaced from a back plate and a tapered guide to produce a free floating connector;
 an infrared signal processor for sending infrared signals in response to the operation of a computer program wherein each set-top box is controlled for testing a plurality of functions of the set-top box in a sequence;
 means for testing in sequence diagnostic tests on each set-top box under test;
 means for performing video test on each set-top box under test comparing a video output of a set-top box under test to a corresponding video output of said known good set-top box;
 means for performing audio test on each set top box under test;
 said means for performing said audio test includes means for capturing a segment of the audio output of said known good set top box, creating from said segment an upper limit of performance envelope, creating a lower limit of performance envelope and testing whether the audio output of each set-top box under test for the same period of time falls between said upper performance envelope and said lower performance envelope; and
 means for displaying test results.

22. An apparatus for testing in accordance with claim 21 wherein said electrical connections on said backplane are provided with resilient mounting means such that the connections may move for ease of alignment with electrical connections on the back of a set-top box.

23. Apparatus in accordance with claim 21 including means for moving said shelf includes a lever for backward and forward movement of said shelf with said set-top box thereon.

24. Apparatus for testing in accordance with claim 21 including a television set connected directly or indirectly to an output of each set-top box.

25. Apparatus in accordance with claim 24 wherein said infrared signal processor sends an infrared signal in response to the operation of said computer program to control said television set for each set-top box.

26. Apparatus for testing in accordance with claim 21 including a receiver for receiving at least selected audio outputs of each set-top box for conversion to an analog signal to be fed to an analog audio analyzer, said set-top box, said television set and said receiver being simultaneously controlled by said infrared signals sent by said infrared signal processor.

27. Apparatus for testing in accordance with claim 21 wherein said positioning means of each shelf for positioning each set top box on such shelf is adjustable.

28. An apparatus for testing in accordance with claim 21 wherein said infrared signals are transmitted from an infrared transmitter mounted in juxtaposition each set-top box.

29. An apparatus for testing in accordance with claim 24 wherein said infrared signals are transmitted to each set-top box by a transmitter mounted in juxtaposition each set-top box and transmitted to each television set by an infrared transmitter mounted juxtaposed each television set.

30. An apparatus for testing in accordance with claim 21 wherein said electrical connections on said backplane are mounted to float for self adjustment to connect to a connection on the back of said set-top box, said connection being mounted between a back plate mounted to the back of said backplane and a front guide plate mounted to front of said backplane.

31. A method of testing set-top boxes, comprising the steps of:
 providing a testing structure for receiving a known good set-top box and a plurality of set-top boxes to be tested, each set-top box having at least one F type coaxial connector and a plurality of RCA type connectors;
 positioning said set-top boxes to be tested on a movable shelf mounted in said testing structure, electrically connecting said at least one F type coaxial connector and said plurality of RCA type connectors to corresponding connectors on a backplane of said testing structure by moving said shelf in a first direction and breaking said electrical connections by moving said shelf in an opposite direction;
 controlling the function of each set-top box by an infrared signal wherein the function of each set-top box to be tested is the same as the function of the good set-top box at each instant of test;
 performing a plurality of diagnostic tests on each set-top box to be tested and comparing the results with the results of the known good set-top box;
 generating an audio output of known good set-top box, testing each of the set-top boxes under test for audio performance by creating an upper performance envelope and a lower performance envelope from the output of the known good set-top box and comparing the audio output envelope of the set-top box under test to said upper and lower performance envelopes of said known good set-top box; and performing video tests on said set-top boxes to be tested by comparing the video output to the video output of the known good set-top box; and displaying diagnostic, audio and video test results for each set-top box under test.

32. A method of testing electronic equipment in accordance with claim 31 wherein said step of testing each of said plurality of set-top boxes to be tested for audio and video performance is performed by comparing the audio output of one of said plurality of set-top boxes to the output of said known good set-top box and comparing the video output of each of said plurality of set-top boxes to be tested to said known good set-top box video output.

* * * * *